(12) United States Patent
Dutertre et al.

(10) Patent No.: US 8,161,867 B2
(45) Date of Patent: Apr. 24, 2012

(54) AUTOMATIC DISPENSER OF GROUND COFFEE

(75) Inventors: Thierry Dutertre, Saint Germain du Corbeïs (FR); Séverine Mih, Mayenne (FR); Fabrice Reveillere, Mayenne (FR)

(73) Assignee: SEB S.A., Ecully (FR)

( * ) Notice: Subject to any disclaimer, the term of this patent is extended or adjusted under 35 U.S.C. 154(b) by 589 days.

(21) Appl. No.: 12/328,513

(22) Filed: Dec. 4, 2008

(65) Prior Publication Data

US 2009/0145302 A1    Jun. 11, 2009

(30) Foreign Application Priority Data

Dec. 6, 2007    (FR) ........................ 07 08511
May 16, 2008   (FR) ........................ 08 02654

(51) Int. Cl.
    *A47J 31/00* (2006.01)
(52) U.S. Cl. ..................... 99/289 R; 222/226
(58) Field of Classification Search ............ 99/286, 99/287, 289 R; 222/226, 227, 236–242, 222/410
    See application file for complete search history.

(56) References Cited

U.S. PATENT DOCUMENTS

| | | | |
|---|---|---|---|
| 2,474,754 A * | 6/1949 | Moxley | 184/82 |
| 2,601,943 A * | 7/1952 | Torrese | 222/129.4 |
| 2,894,662 A | 7/1959 | Mansperger | |
| 5,791,526 A * | 8/1998 | Landais et al. | 222/185.1 |
| 6,205,909 B1 | 3/2001 | Giannelli | |
| 6,253,664 B1 | 7/2001 | Giannelli | |

FOREIGN PATENT DOCUMENTS

DE      14 73 215 A1   10/1968
DE      197 14 303 C1   9/1998

OTHER PUBLICATIONS

National Institute of Industrial Property Preliminary Search Report dated Jun. 6, 2008.

* cited by examiner

*Primary Examiner* — Vishu Mendiratta
(74) *Attorney, Agent, or Firm* — Browdy and Neimark, PLLC

(57) ABSTRACT

An automatic dispenser for ground coffee composed of a reservoir for grounds, the reservoir having a bottom provided with an outlet opening, rotatable dosing paddles at the bottom of the reservoir for dispensing a predetermined quantity of ground coffee through the outlet opening; a drive cone having rotatable blades disposed above the dosing paddles and adapted to be rotated about a vertical axis by a motor assembly, and a mixer in the form or a pyramid disposed above, and forming an extension of, the drive cone. An automatic coffee maker equipped with this dispenser.

16 Claims, 4 Drawing Sheets

SECTION A-A

# AUTOMATIC DISPENSER OF GROUND COFFEE

BACKGROUND OF THE INVENTION

The present invention concerns an automatic dispenser for ground coffee intended to be mounted on an automatic coffeemaker.

An example of an automatic dispenser is described in the patent document FR 2713906 and is composed of a reservoir containing ground coffee and means adapted to transfer, through a flow opening situated in a lower part of the reservoir, a dose of ground coffee into an infusion chamber of an automatic coffeemaker. The transfer, or dosing, means for the coffee grounds are constituted by several rotatable dosing paddles situated at the bottom of the reservoir and carried by a cylindrical body that is driven in rotation around the axis of the reservoir by a motor group. Four other upper radial paddles are carried by a coupling part having an outer conical form. The upper paddles are arranged just above the dosing paddles in order to cause the ground coffee to descend to the bottom of the reservoir, and the upper paddles are driven in rotation by the same means as the dosing paddles. The reservoir is removably mounted in the machine and coupling means are provided between the motor group and the cylindrical body for driving the dosing paddles and the coupling part. Although this device functions satisfactorily, it has been found that certain types of ground coffee have a natural tendency to agglomerate, or form clumps, within the reservoir, with the result of preventing the coffee grounds from descending to the level of the dosing paddles. This presents significant functioning problems above all in the case of an automatic coffeemaker when the infusion, or brewing, chamber is no longer correctly supplied.

One solution was described in the patent document DE 19714303 where the device for dosing the ground coffee comprises two levels of rotatable paddles and means for rotating them in respectively opposite directions. Thus, a lower section having a frustoconical form carries a first series of paddles and is extended toward the top by a conical point carrying, itself, a second series of paddles. The dosing device has first means for rotating the lower section and, between the latter and the mixer, second means permitting to reverse the sense of the first rotation and transferring it to the part at the tip of the cone. According to this document, these means consist of pignons and pulleys. While this device does provide a better movement of the grounds toward the bottom of the reservoir, it has as its main drawback a complex structure, rendering difficult the arrangement of the transmission mechanism in a small space that is limited by the dimensions of the conical part. Moreover, jamming phenomena can occur during infiltration of the grounds at the level of the interstice separating the two movable parts, the mixer and the lower section.

BRIEF SUMMARY OF THE INVENTION

The present invention overcomes, or minimizes, the drawbacks mentioned above and provides an automatic dispenser of ground coffee adapted to dispense, in a manner that is constant over time, a precise quantity of coffee grounds, regardless of the level to which the reservoir is filled with grounds.

The invention further provides an automatic dispenser of grounds that is easy to operate, particularly with regard to filling and cleaning.

The invention further provides an automatic dispenser of grounds that operates in a reliable manner, has a simplified structure and can be fabricated in an economical manner.

More specifically, the present invention provides an automatic coffee grounds dispenser having a reservoir for grounds, the reservoir containing rotatable dosing paddles for transferring a predetermined quantity of ground coffee through a flow opening provided at the bottom of the reservoir and a cone for driving rotatable paddles, or blades, disposed above the flow opening, being driven in rotation by motor means around a vertical axis of the reservoir.

The automatic dispenser for coffee grounds according to the invention thus comprises, at the bottom of its reservoir containing the coffee grounds, dosing means arranged beneath a drive cone having rotatable radial blades moved by motorized drive means. The blades of the drive cone act at the bottom of the reservoir, but above the outlet opening in order to push the grounds toward the adjacent dosing means. Advantageously, the paddles of the dosing means and the blades for transporting the grounds are actuated by using the same drive source, notably by connecting the drive cone to a hub carrying the dosing blades and driven to rotate at the bottom of the reservoir.

According to the invention, the drive cone is extended at the upper part of the reservoir by a mixer in the form or a pyramid, the mixer and cone forming a mixing assembly. The mixer, connected to the drive cone and rotating therewith, thus permits a mixing, or blending, of the grounds also in the upper part of the reservoir, in addition to the mixing that is achieved in the lower part of the reservoir by the blades of the drive cone. By this rotation, the mixer in the form of a pyramid allows the grounds to descend toward the drive cone and from there toward the dosing means in order to be dispensed through the flow outlet opening, and this requires less force from the dispenser motor.

As used herein, a mixer in the form of a pyramid is understood to be a part that, located at the upper end of the drive cone, can have the form of a pyramid or the frustum of a pyramid, with the summit, or smaller end, oriented toward the top. In affect, after numerous studies performed in the laboratory with different forms of mixers, it was discovered that such a form permits the creation of a vortex having a length comparable to the height of the pyramid-shaped mixer, permitting the grounds to be conveyed toward the bottom of the reservoir. Such a mixer arranged above the drive cone thus permits preventing the formation of clumps in the grounds contained in the upper part of the reservoir and assures a good flow thereof, and this even for very fine grounds, for example used for the preparation of espresso.

Preferably, the drive cone and the mixer form a one-piece mixing assembly extending to the level of maximum filling of the reservoir.

Such a one-piece assembly permits the achievement of a mixing, or blending, throughout the entire mask of grounds contained in the reservoir, even when the latter is full.

Advantageously, the reservoir has a transverse cross section of circular form and the mixer has a transverse cross section of square form.

Other forms of cross sections for the mixer, such as triangular, rectangular, diamond-shaped, hexagonal, etc, being possible, it has however been noted during experimental tests performed in the laboratory that a cross-section of square form was effective to convey in a uniform manner all of the coffee grains toward the bottom of the reservoir. Satisfactory results have thus been obtained with a reservoir having a diameter of 100 mm and a mixer having a square cross section with sides measuring between 10 mm at its top and 25 mm at its base without, for that matter, reducing the capacity of the reservoir.

Preferably, the mixer in the form of a pyramid has a height equal to at least one-half that of the mixing assembly.

The phenomena of conveyance, or entrainment, of the grounds toward the bottom of the reservoir begins to appear when the mixer and the drive cone have comparable lengths. According to one variation, such a part in the form of a pyramid can extend over the entire length of the drive assembly.

Advantageously, the mixer in the form of a pyramid has two long fins, or blades, extending radially and arranged in proximity to its lower end.

The length of these two fins is slightly less than the internal diameter of the reservoir in order to permit, during their rotation, a better mixing of the grounds in the upper part of the reservoir and the breaking up of possible peripheral blockages that might form with a very fine grind, oily coffee, which naturally has a strong tendency to agglomerate. Moreover, by using only two fins, in addition, advantageously made in the form of very thin rods, the resistive torque at the interior of the reservoir is limited, while improving the mixing capacity of the device. In addition, limiting of the number of long fins to two also has practical reasons, in order to make available more space to access the interior of the reservoir, for example when it is being cleaned.

Advantageously, the long fins are offset angularly with respect to the blades of the drive cone.

This assures a better mixing and blending throughout the volume of the reservoir. For improved efficiency, one long fin is placed halfway between two rotatable blades of the drive cone situated therebeneath.

Preferably, the mixer in the form of a pyramid also has two radially extending short fins, arranged in proximity to the upper end of the mixer.

These short fins form a means for grasping the mixing assembly (in a manner similar to the wings of a wing nut) by which the user applies a rotational torque when he wishes to turn the assembly manually in order to clean the bottom of the reservoir. By thus turning the mixing assembly, the dosing blades, when turning, sweep the bottom of the reservoir and expel grounds residues through the flow opening.

Advantageously, the long fins are arranged in a vertical plane passing through a diagonal of the transverse cross section of the mixer and the short fins are arranged in a vertical plane perpendicular to the first.

If the mixer is advantageously made of a plastic material by an injection molding technique, this construction of the transverse fins permits a better unmolding of the parts after injection molding.

Preferably, the mixer in the form a pyramid has a peak having a flat upper face that carries an indicator of the filling level of the reservoir.

This is a simple and reliable means to aid filling of the reservoir, such an indication being clearly visible to an observer, without having to take into account considerations of good lighting or of the coloring of the reservoir.

Advantageously, the reservoir is mounted removably in a housing of the dispenser and has means for coupling in rotation with the motor means of the dispenser.

This makes it possible to be able to remove the grounds reservoir in order to replace it with another reservoir containing another type of grounds or in order to clean it.

In an advantageous manner, the internal wall of the reservoir has at least one longitudinal rib projecting into the interior of the reservoir.

Thus, the interior wall of the reservoir has at least one longitudinal rib projecting into the reservoir. Such a protuberant rib forms an obstacle for the grounds being driven by the blades, requiring the coffee grains to turn individually when they are driven by the entrainment blades.

In effect, the grains of coffee, particularly when they are very fine, collect and form clumps or blocks that turn around the axis of the reservoir while being driven by the rotatable blades of the drive cone. As a result of their entrainment in rotation, these blocks strike the internal ribs of the reservoir formed as portions of the internal walls of the reservoir having increased thickness, and are as a result split or broken by these latters. This permits the grains of ground coffee to be separated and to fall to the bottom of the reservoir, from where they are dispensed by the dosing blades through the outlet flow opening of the dispenser.

This permits a uniform flow and a precise dosing of the grounds at the outlet from the dispenser.

Preferably, the width of the at least one longitudinal rib covers a circular arc having an angle equal to or less than that comprised between two adjacent rotatable blades.

The clumps or arches of grounds forming between two adjacent blades, this permits obtaining a good fragmentation of each clump. In addition, two adjacent blades are thus prevented from coming simultaneously in contact with the rib or ribs. In effect, one blade moves away from the arc of the rib, or ribs, before or at the time that the following blade arrives opposite the rib, or ribs. This helps to prevent the creation of an unduly high resistance to rotation, as well as possible overloading of the drive motor of the dispenser.

Preferably, the, or each, rib is a sector of a circular ring having a thickness between 0.1 and 0.5 mm, and preferably equal to 0.2 mm. The rib thus presents a constant thickness, which aids cleaning of the reservoir. During tests performed in the laboratory, it has been noted that a thickness between 0.1 and 0.5 mm, and preferably substantially equal to 0.2 mm, permits the masses of grounds that are in rotation to the broken up effectively, without encroaching on the play existing between the outer diameter of the rotatable drive blades and the inner diameter of the ribs. In effect, this play must be greater than the maximum diameter of the ground coffee grains in order to avoid jamming of the blades, but sufficiently small to break up the agglomerated grains when they arrive in contact with the rib.

Advantageously, the, or each, longitudinal rib extends substantially over the useful height of the reservoir.

The useful height of the reservoir is the distance from the bottom to the level of maximum filling of the reservoir. A rib thus extending over this height permits an efficient action regardless of the level of filling of the reservoir.

The present invention also includes an automatic coffeemaker having a dispenser according to the invention.

BRIEF DESCRIPTION OF THE DRAWING

FIG. 2b is a cross-sectional view taken along the plane A-A of FIG. 2a.

FIG. 3b is a perspective view of the mixing assembly of FIG. 3a.

FIG. 4b is a top plan view of the reservoir of FIG. 4a.

DETAILED DESCRIPTION OF THE INVENTION

Figure 1:
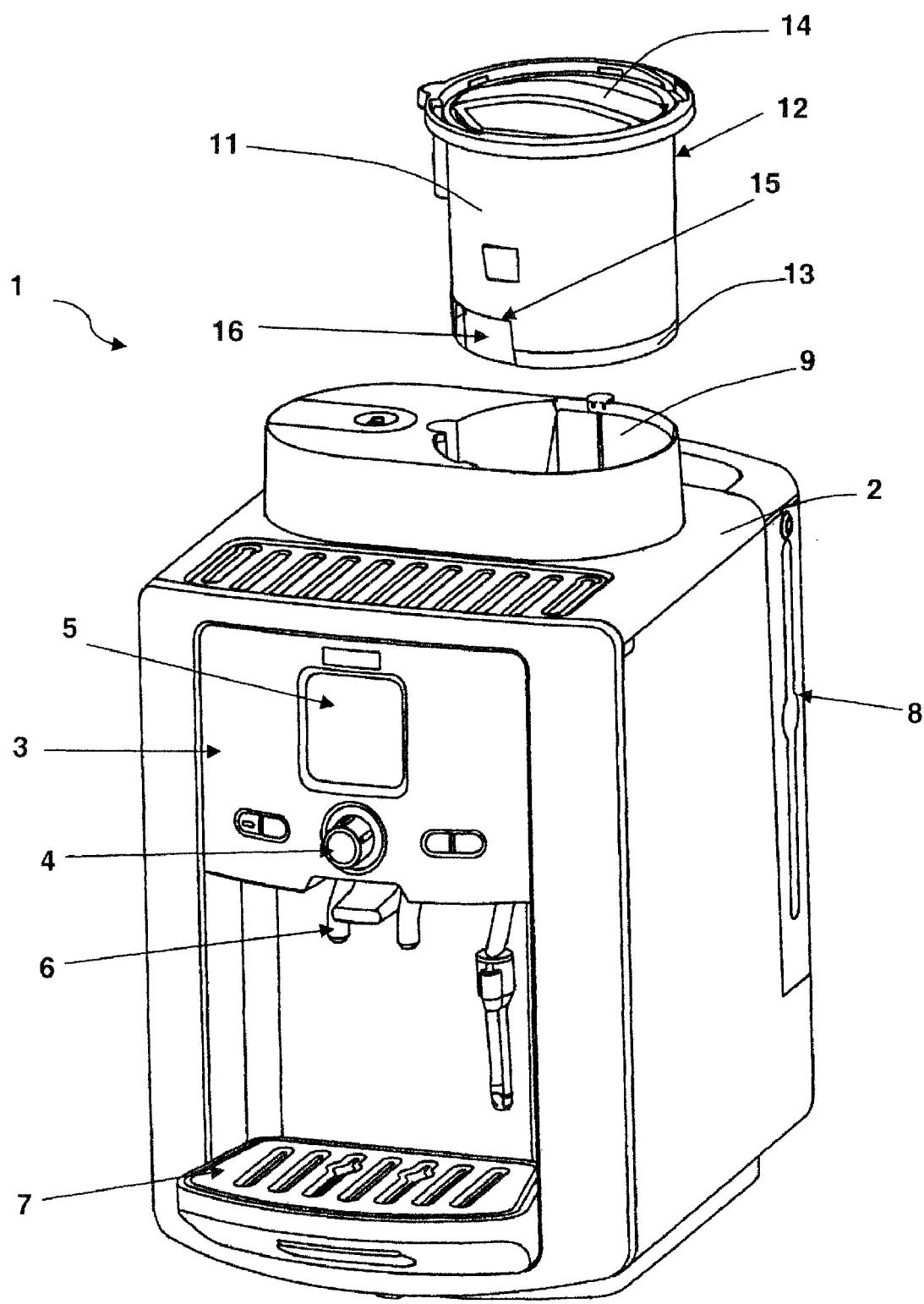
FIG. 1 is a perspective view of an automatic coffeemaker having an automatic grounds dispenser according to the invention, the reservoir of the dispenser being shown in a withdrawn position.

FIG. 1 shows an automatic coffeemaker arranged to be equipped with a dispenser according to the invention. The automatic coffeemaker includes a case 2 that includes a front panel 3 provided with control buttons for and a display 5 to present indications of the operating state of the coffeemaker. A beverage is prepared in a brewing chamber (not shown) that receives a quantity of ground coffee coming from the dispenser, together with hot water under pressure coming from a water heater supplied from a reservoir 8. The brewed beverage flows through two tubes, or nozzles, 6, which deliver coffee into a cup placed on a support surface, or tray, 7. The coffeemaker may also be provided with a receptacle for coffee grounds, or pucks, that have been ejected from the brewing chamber after use.

All of the components of the coffeemaker described above are conventional in the art and the coffee maker can include certain features described in International Patent Application WO 9912457, and its U.S. counterparts, U.S. Pat. Nos. 6,205,909 and 6,253,664, the disclosures of which are incorporated herein be reference, particularly with regard to mechanisms for tamping coffee grounds in the brewing chamber and ejecting used pucks. Such a machine is particularly adapted to bring the water delivered to the brewing chamber to the proper temperature and is capable of compacting the grounds within the brewing chamber. The coffee beverage obtained after brewing of the ground coffee in the brewing chamber is then conveyed out of the machine and into a suitable collecting vessel, such as a coffee cup, as is described, for example, in International Patent Application WO 9912456, having the above-cited U.S. patents as counterparts.

Such a machine is able to deliver numerous coffee servings during several preparation cycles without the user having to intervene in order to replenish the supply of ground coffee or the water, and without having to manually remove the pucks after brewing of each serving.

Figure 2B:
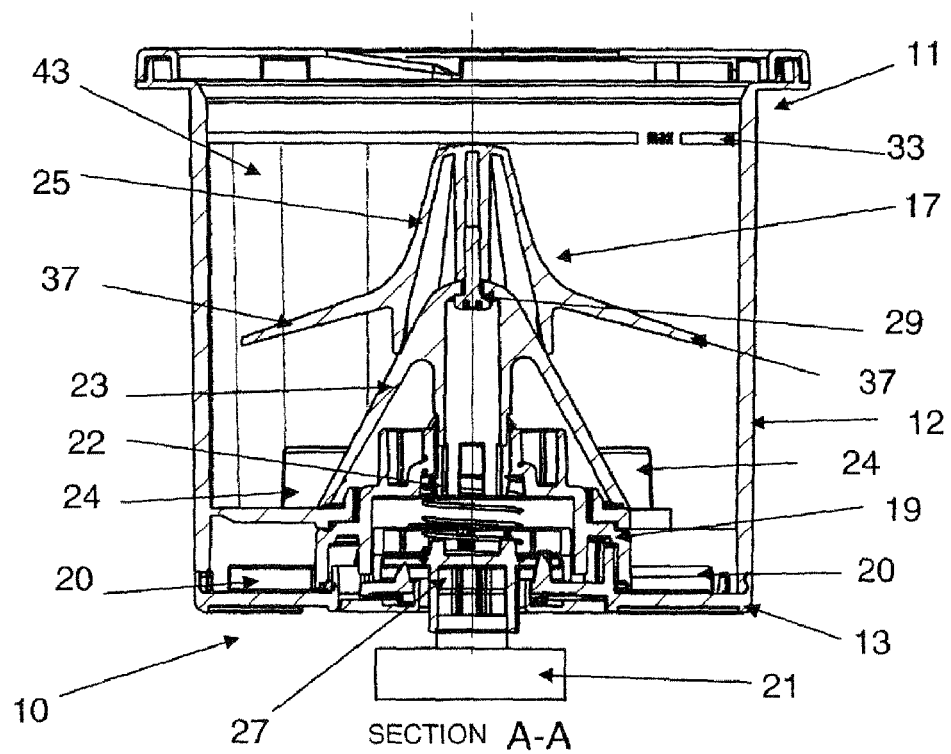

The upper part of case 2 of the coffee maker receives an automatic grounds dispenser, identified by the reference numeral 10 in FIG. 2b, having a reservoir 11 that is removably installed in a housing, or recess, 9 provided in the coffee maker and that is arranged to contain a quantity of ground coffee. Reservoir 11 has a generally cylindrical form, with a side wall 12, a bottom 13 and lid 14. Reservoir 11 has an outlet opening 15 at its lower extremity. More particularly, in the illustrated embodiment, opening 15 is in the form of an oblong, or rectangular, slot provided in part in side wall 12 and extending across bottom 13. A movable shutter having the same form as outlet opening 15 is provided to selectively block the opening when the reservoir is withdrawn from the coffeemaker and is operated, by a suitable conventional mechanism in housing 9, to move away from this opening when the reservoir is introduced into housing 9. Ground coffee that flows out of the reservoir through opening 15 then passes into a transfer chute in order to then fall under the influence of gravity into the brewing chamber of the machine, in a manner already known in the art.

Figure 2A:
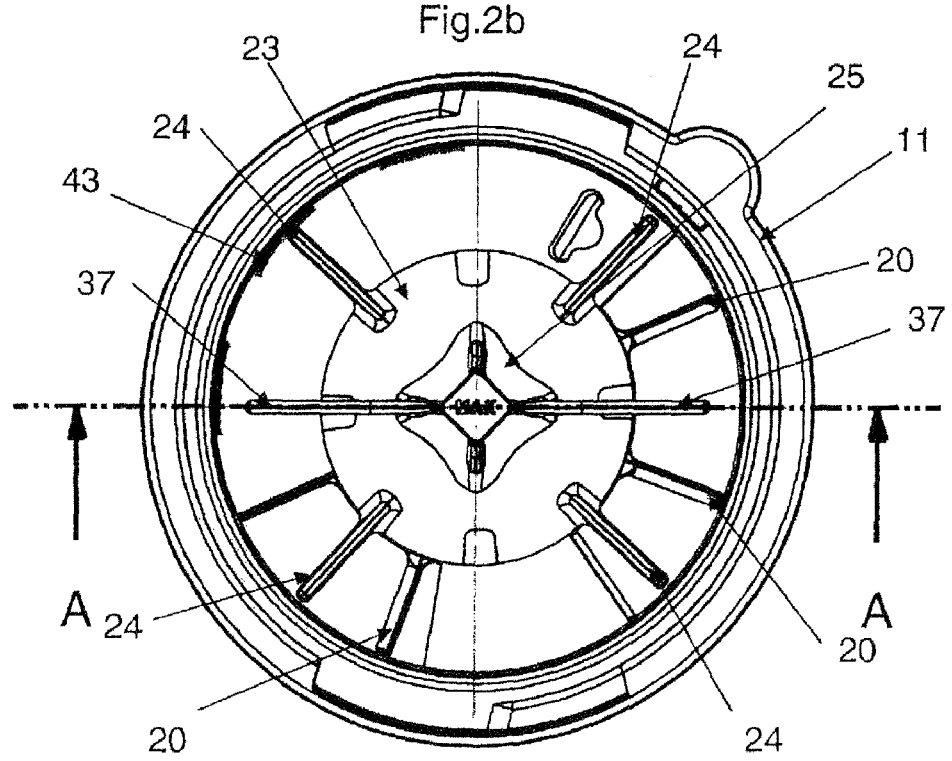
FIG. 2a is a top plan view of the dispenser according to the invention, with the lid of its reservoir being removed.

Dispenser 10 is shown more clearly in FIGS. 2a and 2b, which show, at the interior of reservoir 11, a drive cone 23 provided with several drive blades 24, four drive blades being provided in the illustrated embodiment, the blades being fixed to a cylindrical hub 19 that also carries several dosing paddles 20. In the illustrated embodiment, eight dosing blades are provided. Drive cone 23 includes, at its lower part, several coupling tongues 22 that fix cone 23 at the interior of cylindrical hub 19, the latter being arranged to be driven in rotation by motor means 21 about the vertical axis of reservoir 11. Motor means 21 include, in a conventional manner, a motor, a speed reducer, a control circuit and a power supply circuit (not shown). Reservoir 11 being mounted to be removable, along with cone 23, hub 19 and paddles 20, with respect to the other components of the dispenser, the other components being fixed at the interior of housing 2 of the coffeemaker, cylindrical hub 19 is furnished with detachable rotational coupling means 27 cooperating with corresponding coupling means of motor 21.

In operation, drive cone 23 is rotated by the operation of motor means 21, so that drive blades 24 move ground coffee toward underlying dosing paddles 20, which rotate to lead a dose of grounds to the outlet opening. After dispensing a predetermined dose of ground coffee, motor 21 is halted in a manner to position dosing paddles 20 such that two of them border outlet opening 15 in a manner to prevent further delivery of ground coffee to the outlet opening. The principle of operation of such a ground coffee dispenser is described more fully in European Patent Document EP 0 735 836, and its U.S. counterpart, U.S. Pat. No. 5,791,526, the disclosure of which is incorporated herein by reference.

According to the invention, drive cone 23 is extended upwardly toward the upper part of reservoir 11 by a mixer 25 having a pyramidal form, the peak, or tip, of the pyramid pointing upwardly toward lid 14 of the reservoir. Mixer 25 is fixed to drive cone 23 by a central screw 29 and forms with drive cone 23 essentially a one-piece assembly 17. Mixing assembly 17 is thus caused to rotate about the vertical axis of the reservoir during operation of motor means 21.

Figure 3B:
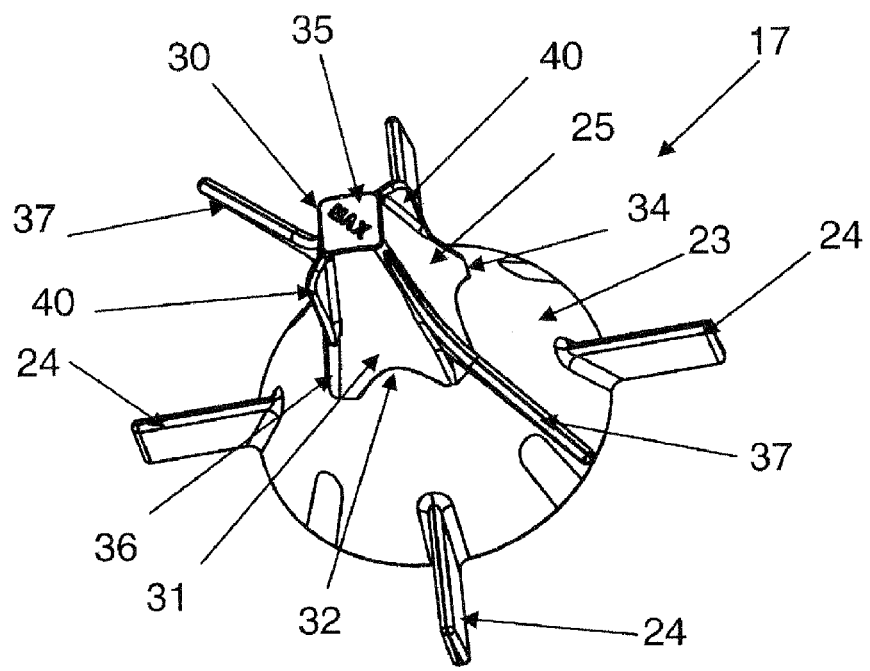
Figure 3A:
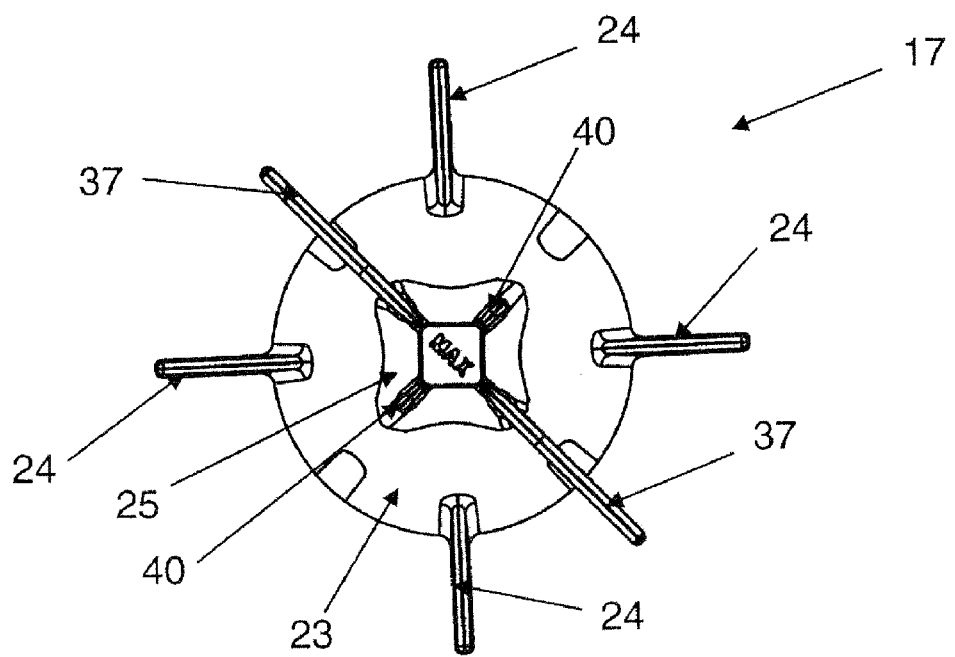
FIG. 3a is a top plan view of a mixing assembly forming a component of the dispenser according to the invention.

The essentially one-piece mixing assembly 17 is shown in further detail in FIGS. 3a and 3b, which show that mixer 25 includes a central body 30 in the form of a frustum of a pyramid having flat sides, the base 34 of which has a generally square form and rests on the tip of drive cone 23. In order to achieve a better contact with the tip of drive cone 23, indentations 32 in the form of circular arcs are provided at the bottom of each face 31 of body 30. The height of body 30 is such that the top of mixing assembly 17 comes to be located at the level of maximum filling (33 in FIG. 2b) of reservoir 11. In order to aid observation of this filling level, peak 35 of body 30 may be provided with the inscription "max".

According to another advantageous feature of the invention, body 30 carries two long fins 37 extending from two diametrically opposed sides of base 34. More specifically, each fin extends radially from a respective ridge 36 of base, or bottom, 34 of body 30, so that the two fins 37 essentially extend along the same diametric line of reservoir 11. Fins 37 extend outwardly to a location close to the internal periphery of wall 12 of reservoir 11, while some spacing, or play, is provided between the outer ends of fins 37 and the inner surface wall 12. In addition, each fin 37 extends slightly downwardly from body 30, for example forming an angle of the order of 20° with respect to the horizontal. In addition, each fin has the form of a rod, or shank, having small cross-sectional dimensions. For example, each fin can have a square cross section measuring of the order of 4 mm on each side. The function of fins 37 is to break up clumps of coffee grounds that may form in the upper part of the reservoir, and more specifically toward the periphery of the reservoir. The axis of each fin 37 is offset angularly, in a horizontal direction, for example at an angle of the order 45° with respect to adjacent blades 24, in order to improve the efficiency of the stirring, or mixing, action.

Body 30 also carries, in its upper part, two short fins 40 extending along the same diametric line in a vertical plane passing through the other diagonal of base 34. In other words, fins 40 are offset, in a horizontal direction, from fins 37 by angles of 90°. At least one short fin 40 has a generally triangular form, one leg of the triangle being located at the level of peak 35. The two short fins 40 form a means for grasping the mixing assembly, in a manner similar the wings of a wing nut, by which the user can apply a rotational torque in order to manually turn the assembly for the purpose of cleaning the bottom of reservoir 11.

According to another advantageous feature of the invention, the inner wall of reservoir 11 is provided with at least one longitudinal rib 43 projecting toward the interior of reservoir 11. In the example shown in the drawings, three longitudinal ribs 43 are provided on the inner face of sidewall 12 of reservoir 11. As can be seen most clearly in FIGS. 4a and 4b, the three ribs 43 are uniformly dispensed over a circular sector forming an angle of 90° about the vertical axis of reservoir 11 and protrude radially toward the center of reservoir 11.

Each rib 43 has the form a sector of a circular ring, having a thickness of the order of 0.2 mm, and a width of the order of 10 mm, and extends over the entire useful height of reservoir 11, particularly at least up to the level 33 of maximum filling of reservoir 11. Such a constant thickness permits individual grains of ground coffee to slide over the part in the form of an arc of a circle of each rib and equally facilitates cleaning of reservoir 11. Ribs 43 are preferably made in one piece with wall 12 of reservoir 11, preferably of a plastic material produced by an injection molding technique.

Figure 4A:
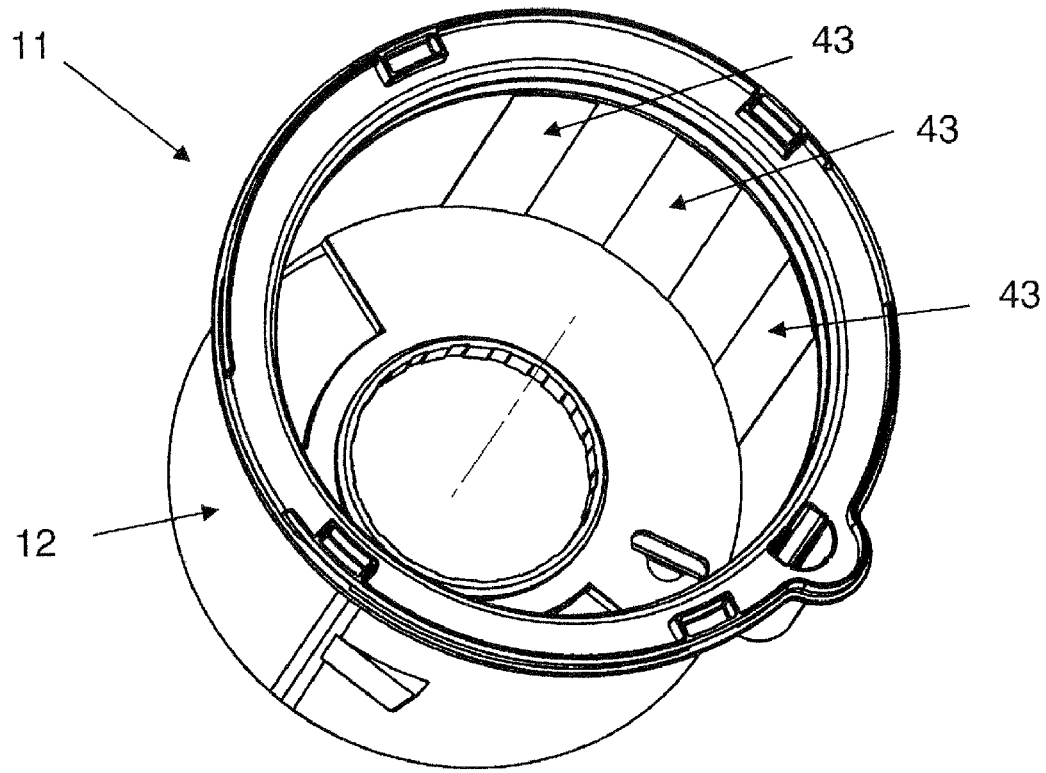
FIG. 4a is a perspective view of a reservoir of a dispenser according to the invention, with its lid removed.
Figure 4B:
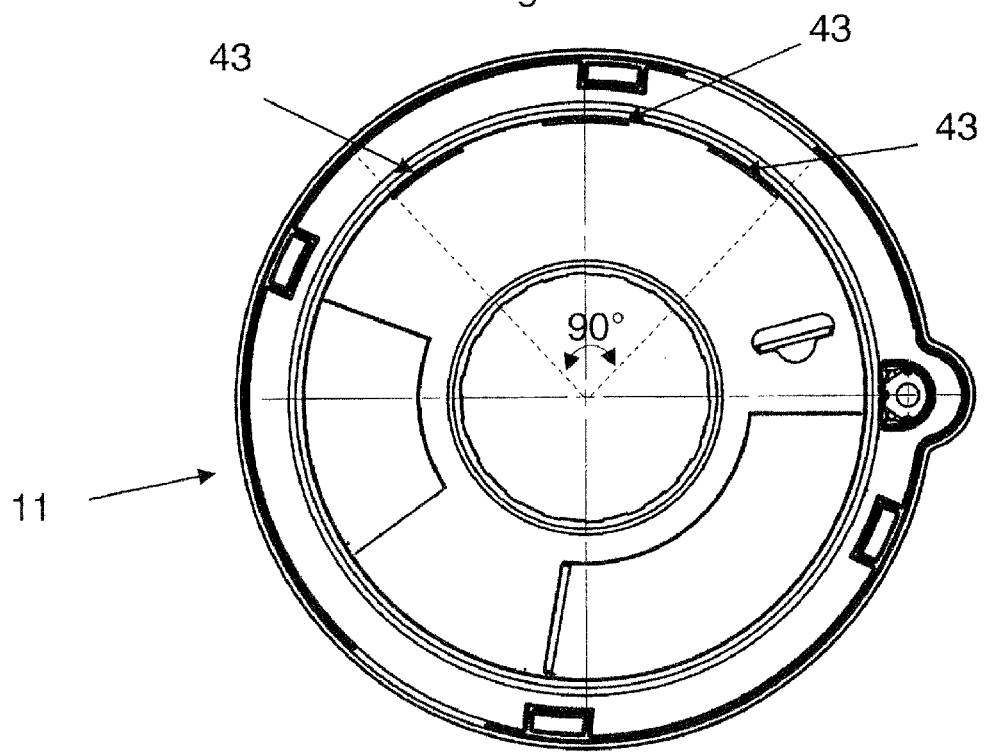

It is noted that FIGS. 4a and 4b appear to show two openings in the bottom of reservoir 11. These opening are in an intermediate wall above bottom 13. Dosing blades 20 are located between that intermediate wall and bottom 13. The intermediate wall corresponds in function to a wall "33" shown in U.S. Pat. No. 5,791,526, cited above. Bottom 13 contains, as described above, only one opening 15.

In operation, the user fills reservoir 11 by pouring ground coffee up to a level no higher than the "max" level of peak 35. Reservoir 11 is then installed in the automatic coffeemaker. When the user instructs the machine to provide a serving of coffee, motor means 21 are placed in operation to rotate cylindrical hub 19 and mixing assembly 17. This has for its effect to stir, or mix, the coffee grounds in the upper part of the reservoir with the aid of mixer 25 having the form of a pyramid. Clumps or blockages of coffee grounds, or even possible arches, are broken up as they come in contact with ribs 43 while being carried along by blades 24 and by long fins 37. The coffee grounds thus made uniform and fluidized arrive at the level of dosing paddles 20, which dispense the required dose through flow outlet opening 15. Thus, several coffee servings can be prepared in succession without intervention by the user. When reservoir 11 is empty, it can be removed from the coffeemaker and the user can clean coffee residues therefrom, for example manually with the aid of a brush, and then turn the mixing assembly 17 by hand, by applying a rotational movement to short fins 40. Reservoir 11 can then be refilled with a new supply of ground coffee.

Of course, the invention is not limited to the embodiment described and illustrated, which is given only by way of non-limiting example. Thus, long fins 37 and short fins 40 need not be planar, but can have a spiral form, being curved in the clockwise or counterclockwise sense. The long radial fins can terminate in a descending part that passes along the inner surface of cylindrical wall 12 of reservoir 11.

This mixing system can be used with other powdered or ground products, such as powdered milk, sugar, etc.

Various modifications remain possible, particularly from the point of view of the construction of the various elements or by substitution of technical equivalence, without departing from the framework of the present invention.

This application relates to subject matter disclosed in French Application numbers FR 07 08511, filed on Dec. 6, 2007, and FR 08 02654, filed on May 16, 2008, the disclosures of which are incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automatic dispenser for ground coffee comprising: a reservoir for grounds, said reservoir having an interior for containing the ground coffee and a bottom provided with an outlet opening that communicates with the interior; rotatable dosing paddles at the bottom of said reservoir for dispensing a predetermined quantity of ground coffee through said outlet opening; a drive cone having rotatable blades disposed above said dosing paddles, said drive cone comprising a coupling structure for coupling said drive cone to motor means for rotation of said drive cone about a vertical axis by the motor means; and a mixer in the form of a pyramid disposed above, fixed to, and forming an extension of, said drive cone, said mixer being rotatable with said drive cone and said pyramid having generally flat sides.

2. The dispenser of claim 1, wherein said reservoir has a maximum fill level and said drive cone and said mixer form a one-piece mixing assembly extending to the maximum fill level of said reservoir.

3. The dispenser of claim 2, wherein said reservoir has a transverse cross section of circular form and said mixer has a transverse cross section of square form.

4. The dispenser of claim 1, wherein said drive cone and said mixer form a mixing assembly and said mixer has a height equal to at least one-half the height of said mixing assembly.

5. The dispenser of claim 1, wherein said mixer comprises two long fins extending radially and arranged in proximity to the lower end of said mixer.

6. The dispenser of claim 5, wherein said long fins are offset angularly with respect to said blades of said drive cone.

7. The dispenser of claim 1, wherein said mixer comprises two radially extending short fins, arranged in proximity to the upper end of said mixer.

8. The dispenser of claim 7, wherein: said mixer further comprises two long fins extending radially and arranged in proximity to the lower end of said mixer; said long fins are arranged in a first vertical plane passing through a diagonal of the transverse cross section of said mixer; and said short fins are arranged in a second vertical plane perpendicular to the first vertical plane.

9. The dispenser of claim 1, wherein said mixer has a peak having a flat upper face that carries an indicator of the filling level of said reservoir.

10. The dispenser of claim 1, wherein said reservoir is adapted to be mounted removably in a housing for said dispenser and comprises means for coupling in rotation with the motor means.

11. The dispenser of claim 1, wherein said reservoir has a side wall with an internal surface and at least one longitudinal rib projecting from said internal surface into said reservoir.

12. The dispenser of claim 11, wherein said at least one longitudinal rib has a width, in a direction about the vertical axis, that covers a circular arc having an angle equal to or less than the angle between two adjacent rotatable blades.

13. The dispenser of claim 12, wherein said at least one rib has the form of a sector of a circular ring having a thickness between 0.1 and 0.5 mm.

14. The dispenser of claim 13, wherein said at least one rib has a thickness of about 0.2 mm.

15. The dispenser of claim 11, wherein said at least one rib extends substantially over the useable height of said reservoir.

16. An automatic coffee maker comprising: a case provided with a housing; and said dispenser of claim 1 disposed in said housing.

* * * * *